(12) United States Patent
Forte et al.

(10) Patent No.: US 11,074,512 B1
(45) Date of Patent: Jul. 27, 2021

(54) CYBERSECURITY INCIDENT RESPONSE AND SECURITY OPERATION SYSTEM EMPLOYING PLAYBOOK GENERATION AND PARENT MATCHING THROUGH CUSTOM MACHINE LEARNING

(71) Applicant: DFLABS S.P.A., Milan (IT)

(72) Inventors: Dario V. Forte, Torre de' Picenardi (IT); Michele Zambelli, Cremona (IT); Tomáš Drtina, Kunratice-Praha (CZ)

(73) Assignee: DFLABS S.P.A., Milan (IT)

( * ) Notice: Subject to any disclaimer, the term of this patent is extended or adjusted under 35 U.S.C. 154(b) by 0 days.

(21) Appl. No.: 16/869,335

(22) Filed: May 7, 2020

(51) Int. Cl.
*H04L 29/06* (2006.01)
*G06N 5/04* (2006.01)
(Continued)

(52) U.S. Cl.
CPC ............ *G06N 5/047* (2013.01); *G06K 9/6215* (2013.01); *G06K 9/6223* (2013.01);
(Continued)

(58) Field of Classification Search
CPC ............. H04L 63/1416; H04L 63/1425; H04L 63/1441; H04L 63/20; H04L 63/205;
(Continued)

(56) References Cited

U.S. PATENT DOCUMENTS 9,306,966 B2   4/2016   Eskin et al.
9,386,041 B2   7/2016   Carver et al.
(Continued)

OTHER PUBLICATIONS

Security Orchestration, Automation and Response (SOAR) Technology, DFLABS, Sep. 2018.*
(Continued)

*Primary Examiner* — Minh Dinh
(74) *Attorney, Agent, or Firm* — Browdy and Neimark, P.L.L.C.

(57) ABSTRACT

A cybersecurity incident is registered at a security incident response platform. At a playbook generation system, details are received of the cybersecurity incident from the security incident response platform. At least some of the details correspond to a set of features of the cybersecurity incident. A set or subset of nearest neighbors of the cybersecurity incident is localized in a feature space. The nearest neighbors of the cybersecurity incident are other cybersecurity incidents having a distance from the cybersecurity incident within the feature space that is defined by differences in features of the nearest neighbors with respect to the set of features of the cybersecurity incident. A playbook is created for responding to the cybersecurity incident having prescriptive procedures based on occurrences of prescriptive procedures previously employed in response to the nearest neighbor cybersecurity incidents. The differences in features of the nearest neighbors with respect to the set of features of the cybersecurity incident are calculated, for at least one feature, using a present-or-equal metric, and for at least one other feature, using a symmetric difference metric. The playbook generation system is also a parent recommendation system, which identifies a parent for the cybersecurity incident, based on distances of the nearest neighbors of the cybersecurity incident in the feature space. The parent recommendation system adjusts, based on the recommended parent or the parent other than the recommended parent being selected, weights of features upon which distances in the feature space are based.

20 Claims, 17 Drawing Sheets

(51) Int. Cl.
*G06N 20/00* (2019.01)
*G06K 9/62* (2006.01)

(52) U.S. Cl.
CPC .......... *G06K 9/6276* (2013.01); *G06N 20/00* (2019.01); *H04L 63/1416* (2013.01); *H04L 63/1441* (2013.01)

(58) Field of Classification Search
CPC ...... G06G 21/554; G06N 5/047; G06N 20/20; G06K 9/6215; G06K 9/6223; G06K 9/6276
See application file for complete search history.

(56) References Cited

U.S. PATENT DOCUMENTS

| | | | |
|---|---|---|---|
| 9,609,009 B2 | 3/2017 | Muddu et al. | |
| 10,412,117 B2 | 9/2019 | Forte | |
| 10,439,884 B1 | 10/2019 | Forte | |
| 10,614,535 B2 | 4/2020 | Forte | |
| 10,721,266 B1* | 7/2020 | Herman-Saffar | H04L 63/1416 |
| 2008/0098219 A1 | 4/2008 | Forte | |
| 2016/0044061 A1 | 2/2016 | Forte | |
| 2018/0020021 A1* | 1/2018 | Gilmore | H04L 63/1441 |
| 2019/0268354 A1* | 8/2019 | Zettel, II | H04L 63/1416 |

OTHER PUBLICATIONS

Automation as a Force Multiplier in Cyber Incident Response, DFLABS, Jan. 2019.*

Keller et al.,"A fuzzy k-nearest neighbor algorithm," IEEE transactions on systems, man, and cybernetics, pp. 580-585, vol. SMC-15, No. 4, (Jul./Aug. 1985).

Enright, "Using a "Playbook" Model to Organize Your Information Security Monitoring Strategy", Cisco Blog, blogs.cisco.com/security/using-a-playbook-model-to-organize-your-information-security-monitoring-strategy, (Nov. 1, 2013), downloaded Jun. 12, 2017.

* cited by examiner

| Incman Type | Feature | Metric |
| --- | --- | --- |
| TEXT | | |
| ENUM | Float | PresentOrEqual |
| CHECKBOX | Boolean | PresentOrEqual |
| DATE | | |
| DATE_TIME | | |
| TIMEZONE | Float | PresentOrEqual |
| TAGS | Set of strings | Symmetric difference |
| DYNAMIC | | |
| LINK | | |
| COLOR | | |
| LDAP | | |
| MULTI_SELECT_LIST | Set of integers | Symmetric difference |
| IP | String | PresentOrEqual |
| CALCULATION | | |
| HASH | String | PresentOrEqual |
| EMAIL | String | PresentOrEqual |
| URL | String | PresentOrEqual |
| FILENAME | String | PresentOrEqual |
| USER DETAILS | | |

Fig. 2

CREATE NEW INCIDENT

DETAILS | ADDITIONAL INFO | CUSTOM DETAILS | PARENT FOLDER | RELATED INCIDENTS | INVESTIGATORS | KNOWLEDGE BASE | NOTIFICATIONS

- Create from template: [- Please select -]
- * Kind: [- Please select -] +
- * Status: [Open] +
- * Incident ID / Forensic no.1: [Lable Lable inc] ◊ [-MONTH]-[DAY]-[COUNTER]
- * Start time: [ ] ×
- End time: [ ] ×
- ☐ Inhibit phases management.

Selectable Items +
| -Please select- |
| Audit |
| Denial of Service |
| Malware |
| Phishing |
| Spamming |
| Vulnerabilities |

↑↓

Selected Items

* Type:

* Purpose: [Investigation] +
* Restriction - Severity: [Unclassified] +
Short description: [ ]

SAVE   CLOSE

INCMAN  DASHBOARD  INCIDENTS  OPERATIONS  DATA SOURCES  ANTI-FRAUD

INCIDENTS > ARK-121 > INCIDENT DETAILS

ADD INVESTIGATORS   ✎ EDIT   ↓ EXPORT

Opening time: 03-12-19 15:03:02   Type: ARK

← Back to overview
⊙ Incident
  ··· Detection*          Containment*    Remediation    Recovery    Post-Incident
      15D 20h 58m ≡ Details
  > Playbook        Generated by            Syslog events
  > Runbook    1    Parent                  ARK-73
  > Involved assets Kind                    01-01-2019 00:00:00 originating_IP=10.0.0.1 target_IP=10.0.0.16 dflabs
  > Tasks           Status                  Open
  ※ Observables    Incident ID             ARK-121
  ⚙ External alerts Inhibit phases management
  📄 Documentation  Category                General
                    Type                    ARK
                    Restriction - Severity  Unclassified
                    Short description       Created automatically from SysLog events rule ARK test the
                    Timezone                2019-12-03 14:03:01 GMT
                                            GMT +1.00 Central European Time, West Africa Time
                    Campo Numeric (PRISM TEST?)  1
                    SLA (Duration)          15 days 20 hours 58 minutes 21 seconds
                    Incident owner          michele zambelli ☐ Timing
                      Start time            03-12-19 15:03:02
                      Working time          15 d, 20 h Ownership history
  Show  10  entries

Fig. 12

INCMAN  DASHBOARD  INCIDENTS  OPERATIONS  DATA SOURCES  ANTI-FRAUD

INCIDENTS > ARK-121 > RUNBOOK

Opening time: 03-12-19 15:03:02    Type: ARK

← Back to overview

⊖ Incident
  › Details
  › Playbook
  › Runbook
  › Involved assets
  › Tasks
⚙ Observables
⛬ External alerts
▤ Documentation Runbook

| | | Last execution of 1 | |
|---|---|---|---|
| ARK correlation | Rev. 1 | | |
| | Status | Start time | End time |
| | Completed | 03-12-19 15:03:04 | 03-12-19 15:03:21 |

+ ADD RUNBOOK

Fig. 13

Test action

Run 'Get parents for incident' action over ARK OIF

Resource*: [ARK correlation ▼]

Configurations

Tenant Name: [incman-master]
Tenant name, default: incman-master

Incident ID: [ ]
Incident ID (if empty the current incident ID will be used)

Number of parents: [ ]
Maximum number of parents to be suggested by ARK (default: 10)

Confidence Threshold: [ ]
Check if the confidence of the match is at least X%

Distance Threshold: [ ]
Check the distance of the incident to the match (0 = Closest, 100 = farthest)

Normalized Distance Threshold: [ ]
Check the normalized distance of the incident to the match (0 = Closest, 100 = farthest)

Relevance Age Ratio: [ ]
Importance of the incident age in match (0 = Not Important, 100 = Very Important)

Present: [ ]
Check if at least X fields are involved in the match (present >= X)

TEST ACTION   CLOSE

Fig. 15

MAN  DASHBOARD  INCIDENTS  OPERATIONS  DATA SOURCES  ANTI-FRAUD

INTEGRATIONS  + ADD RESOURCE  ⋕ VIEW OPTIONS  ↑ UPLOAD  ✎ EDIT  ▬ DELETE  ↓ EXPORT ark
ARK OIF

ARK OIF

Show 10 entries

| LABEL | CREATED |
|---|---|
| ★ ARK correlation | 20-11-19 11:05:31 |

Showing 1 to 1 of 1 entries
+ ADD ACTION
Enrichment

Get parents for incident                Use it in Anti-Fraud section

Optional fields:
- Confidence Threshold
- Distance Threshold
- Incident Field Age
- Incident ID
- Matching
- Matching Percentage
- Maximum parent age
- Maximum parent age unit
- Normalized Distance Threshold
- Number of parents
- Present
- Present Percentage
- Relevance Age Ratio
- Tenant Name

Fig. 16

Edit resource "ARK correlation"

DETAILS    PROXY

* Label: ARK-correlation

* URL: https://10.0.0.98

* Port: 8000

Timeout connection (sec): 180

Verify server certificate

* JWT token: .....

TEST SAVED SETTINGS    SAVE    CLOSE

Fig. 17

CYBERSECURITY INCIDENT RESPONSE AND SECURITY OPERATION SYSTEM EMPLOYING PLAYBOOK GENERATION AND PARENT MATCHING THROUGH CUSTOM MACHINE LEARNING

TECHNICAL FIELD

The field of this invention generally relates to cybersecurity incident response and security operation systems, and more particularly to such systems employing playbooks containing sets of "plays" or prescriptive procedures for responding to cybersecurity incidents, or runbooks containing flows of connected activities, each one depending on the results of each action, supported with automation engines.

BACKGROUND

Certain cybersecurity incident response and security operation systems, such as the IncMan incident response platform available from DFLabs, incorporate the use of playbooks to assist a user in responding to a cybersecurity incident.

Playbooks are collections of manual and automated actions designed to resolve an incident or complete an investigation. For example, in the IncMan platform, sets of predefined playbooks can be provided based on different industry standards. Each incident is categorized according to one or more type values, and these type values are used to match related playbooks to an incident. Each playbook is described by some properties including type, category and actions that can be grouped in subcategories. Multiple playbooks can be linked to the same incident. Actions to be assigned to users can be defined into a playbook. Additionally, automatic actions for enrichment containment and notification of the incident can be assigned as part of each playbook.

In an early version of the IncMan platform, the user could select from a number of pre-constructed playbooks and later customize the playbooks. The playbooks were proposed based only on the type of the incident in an incident record (so no other incident fields of the incident record were taken into account) and any subsequent user customization (i.e., addition and removal of actions) was not taken into account in the proposing of pre-constructed playbooks.

U.S. Pat. No. 10,439,884, filed by the applicant of the present application, the entire disclosure of which is hereby incorporated herein by reference, describes a system for playbook generation through custom machine learning, for use in cybersecurity incident response systems such as the IncMan incident response platform, that improved upon the above-described playbook selection and user customization system. According to this playbook generation system, a set or subset of nearest neighbors of a new cybersecurity incident is localized in a feature space. The nearest neighbors of the new cybersecurity incident are other cybersecurity incidents having a distance from the new cybersecurity incident within the feature space that is defined by differences in features of the nearest neighbors with respect to the set of features of the new cybersecurity incident. A custom playbook is created for responding to the new cybersecurity incident, the custom playbook having prescriptive procedures that are based on occurrences of prescriptive procedures previously employed in response to the nearest neighbor cybersecurity incidents, and on distances of the nearest neighbors of the new cybersecurity incident in the feature space. Thus, the custom machine learning system proposes a playbook tailor-made for the new incident based on all data available at any time about the incident and similar incidents (including all relevant fields of the new incident and all past pairings of similar incidents with playbooks), or based on at least some of the available data. The custom machine learning system is able to learn a model based on historical data. This model can integrate past decisions (i.e., past selections of playbooks playbook customizations) of the users and for each new incident, it can provide a number of playbooks based on the model.

Furthermore, according to this system for playbook generation, a user of the security incident response platform can respond to a cybersecurity incident by initiating prescriptive procedures that differ from the prescriptive procedures contained in the playbook, and then the cybersecurity incident is recorded in the feature space and the prescriptive procedures actually initiated by the user are automatically tied to the cybersecurity incident, thereby automatically altering subsequent recommendations of playbooks for responding to cybersecurity incidents having features similar or identical to the set of features of the new cybersecurity incident. Thus, it possible to integrate user customization, as well as user removal or addition of actions after playbook selection, as an automatic feedback into the system such that the system knows which actions of the playbook were correctly proposed and which were not.

The playbook generation system described in the above-referenced U.S. Pat. No. 10,439,884 can include the following:

1) Ability to provide a playbook (i.e., a set of actions) based on relevant fields of the new incident and based on all past pairings of incident with playbook(s);
2) Ability to integrate user feedback, i.e., removal or addition of actions after playbook selection;
3) Ability to respond in real time, i.e., provide playbook for a new incident almost instantly;
4) Ability to work with sparse or limited amount of data; and
5) Ability to consider Common Event Format (CEF) fields for playbook recommendation. CEF are used to describe artifacts inside every incident.

The machine learning concept is based on the principle of looking at past incidents that are similar to a new incident. Once such similar incidents are found, their playbooks are collected as relevant ones and reasoned over. The playbooks can be also represented as sets of actions. Then the frequency with which specific actions are included in all playbooks is considered. Based on the frequency of action presence and distance of relevant playbooks, a weight between 0 and 1 is assigned to all actions present in the platform of the cybersecurity incident response system.

Subsequently, user feedback is integrated: actions that were previously rejected by the user are less likely to be proposed and actions that were previously manually added (so-called custom actions) are considered for addition.

Finally, given a threshold (i.e., a number between 0 and 1), a playbook is proposed with all actions with weight above the threshold. By giving (or predefining) multiple thresholds, the system can propose multiple playbooks simultaneously.

The incidents naturally form a hierarchy that currently needs to be manually specified by the user. This process is a user activity for managing incidents in the cybersecurity incident response system that can take a lot of time and that requires a great knowledge of the formal incidents. Every incident comes with multiple values and information to describe a single situation. It is often useful to the user to aggregate similar incidents to reduce and avoid repeated handling activities, often marking as duplicated or false positive the repeated items or binding them together as related entities. This process can be done manually considering type, kind, timings, artifact details, and all the possible fields/features the user has defined to fulfill a target.

Other previous patent applications filed by or assigned to the applicant of the present application pertaining to cybersecurity incident response systems and digital evidence control systems include U.S. patent application Ser. No. 11/784,794 filed Apr. 10, 2007 (corresponding to U.S. Pat. No. 10,614,535); U.S. patent application Ser. No. 14/521,328, filed Oct. 22, 2014 (corresponding to U.S. Pat. No. 10,412,117); and U.S. patent application Ser. No. 16/675,524, filed Nov. 5, 2019, the entire disclosures of which are hereby incorporated herein by reference. It is contemplated that the system described herein may be used in connection with cybersecurity incident response and security operation systems employing the subject matter described in all of the above-referenced previous patent publications.

SUMMARY

It is an object of the present invention to provide even further improvements to the system described in U.S. Pat. No. 10,439,884.

In one aspect, the invention features a system and method for responding to cybersecurity incidents, in which, at a security incident response platform, a cybersecurity incident is registered. At a playbook generation recommendation system, details of the cybersecurity incident are received from the security incident response platform. At least some of the details corresponding to a set of features of the cybersecurity incident. A set or subset of nearest neighbors of the cybersecurity incident are localized in a feature space, the nearest neighbors of the cybersecurity incident being other cybersecurity incidents having a distance from the cybersecurity incident within the feature space that is defined by differences in features of the nearest neighbors with respect to the set of features of the cybersecurity incident. A playbook is created for responding to the cybersecurity incident, the playbook having one or more prescriptive procedures, for responding to the cybersecurity incident registered by the security incident response platform, that are based on occurrences of prescriptive procedures previously employed in response to the nearest neighbor cybersecurity incidents, and on distances of the nearest neighbors of the cybersecurity incident in the feature space. At the security incident response platform, the playbook containing the one or more prescriptive procedures for responding to the cybersecurity incident is presented at the security incident response platform. At the security incident response platform. the one or more prescriptive procedures contained in the playbook are initiated to respond to the cybersecurity incident. The differences in features of the nearest neighbors with respect to the set of features of the cybersecurity incident are calculated, for at least one feature, using a present-or-equal metric having a first value if both values of the feature are missing or both values are present and equal, a second value if only one value of the feature is missing, but the other value is present, and a third value if both values of the feature are present, but not equal. For at least one other feature, the differences in features are calculated using a symmetric difference metric having a value computed based on a number of items in a first set that are not present in a second set and a number of items in a second set that are not present in a first set.

In another aspect of the invention, the playbook generation system is also a parent recommendation system, which identifies a parent for the cybersecurity incident, based on distances of the nearest neighbors of the cybersecurity incident in the feature space. At the security incident response platform, the playbook containing the one or more prescriptive procedures for responding to the cybersecurity incident is presented, and a parent for the cybersecurity incident identified by the playbook generation and parent recommendation system is recommended.

In another aspect of the invention, at the security incident response platform, the recommended parent or a parent other than the recommended parent is selected. The parent recommendation system adjusts, based on the recommended parent or the parent other than the recommended parent being selected, weights of features upon which distances in the feature space are based. The parent recommendation system is programmed to decrease weights of features of the recommended parent if the recommended parent is selected, and, if the parent other than the recommended parent is selected, to decrease weights of features of the parent other than the recommended parent or to increase weights of features of the recommended parent.

The details of various embodiments of the invention are set forth in the accompanying drawings and the description below. Numerous other features and advantages of the invention will be apparent from the description, the drawings, and the claims.

DESCRIPTION OF THE DRAWINGS

FIG. 2 is a list of incident field types and their associated representation, described as features and metrics, in order to transform the incident into a set of features in a feature space.

FIG. 9 is a screen display through which a user can notify a cybersecurity incident response system of the creation of an incident.

FIG. 11 is a screen display through which a different custom playbook is presented to a user.

FIG. 12 is a screen display through which a user can view details of an incident as well as an identification of the recommended parent.

FIG. 13 is a screen display through which a user can view one or more runbooks associated with the incident, including the workflow of a runbook for recommending one or more parents of the incident.

FIG. 15 is a screen display of an action form through which a user can configure and test the "get parents for incident" action.

FIG. 16 is a screen display through which a user can view an overview of an integration for recommending one or more parents of the incident, defined through the open integration framework.

FIG. 17 is a screen display of a form through which a user can edit resource settings of the integration for recommending one or more parents of the incident.

DETAILED DESCRIPTION

Figure 1:
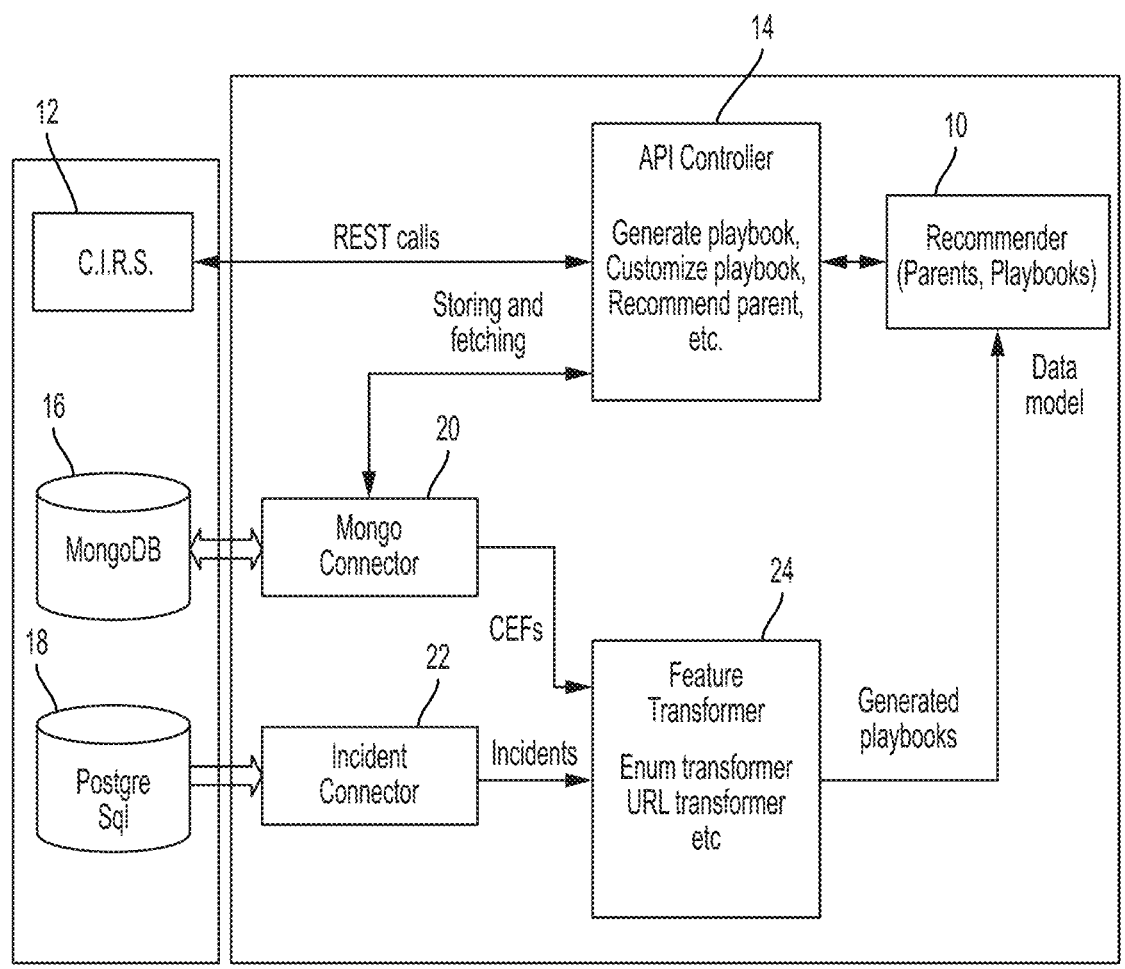
FIG. 1 is a block diagram of the architecture of a playbook generation and parent recommendation system according to the invention interfacing with a cybersecurity incident response system.

The present invention provides a system designed to stand independently on a platform of a cybersecurity incident response system, such as, for example, the IncMan incident response platform available from DFLabs.

The custom machine learning system provided by the present invention improves upon the custom machine learning system described in the above-referenced U.S. Pat. No. 10,439,884 by incorporating the following capabilities:

Re-engineered feature computation: The custom machine learning system has been improved to handle more complex features and metrics. Previously, the custom machine learning system only checked whether features such as IP addresses or emails had a filled field. According to the present invention, the custom machine learning system can also check whether the values of such features are equal. Previously, for enum features it was necessary to create a new feature for every possible value of the enum, which increased the size of the feature space model significantly (this problem was handled by ignoring the values that appeared the least often). According to the present invention, the value of such features is accepted as sets, and thus it is no longer necessary to ignore the values, and the distance between two sets can be computed by looking at the symmetric difference.

Note that the custom machine learning system is a service that exposes some API endpoints to provide information about playbook actions and, now, similar incidents, and the custom machine learning system offers some configuration and management endpoints, too. The above-described changes necessitate changes in the API endpoints used by the custom machine learning system described in U.S. Pat. No. 10,439,884, and in particular, the endpoint for getting features is now obsolete, and therefore this endpoint is removed. Since this removed endpoint was previously used to check whether an incident is in the feature space model, a new endpoint has been added for checking this information.

Parent matching algorithm implemented: The custom machine learning system can now recommend a parent incident, out of the existing incidents, for a given incident, through a playbook or runbook action. The technique employed for recommending a parent incident is similar to the technique for predicting playbooks, but instead of returning playbooks, only the nearest neighbor is found and returned along with a confidence level. Two new API endpoints were added for this feature for finding parents for existing incidents and new incidents. The custom machine learning system has been developed to automatically clusterize the stored incident details space, and to offer suggestions about previous incidents as similar as possible (considering the fields/features values) to the one the user is currently managing.

Feature weight update based on user feedback implemented: The custom machine learning system can now collect feedback from users when the user chooses a parent incident. When a user chooses a parent incident, the custom machine learning system will be notified which parent incident the user chose, which can be compared with the recommendation of the parent matching algorithm. Based on this information, the weights of the features in the feature space model are updated. Since now the weights are modified by the custom machine learning system, the weights of the features have been changed from being integers in range <0; 8> to floating point numbers in the same range. A new API endpoint has been created for the cybersecurity incident response platform to notify the feature space model of the use feedback when the user chooses a parent incident.

System Architecture:

With reference to FIG. 1, one embodiment of a playbook and parent recommendation system 10 according to the invention is accessed by a cybersecurity incident response system 12 through a predefined application program interface (API) under the control of API controller 14, and responds to a number of requests generated by cybersecurity incident response system 12. For example, cybersecurity incident response system 12 makes REST calls to API controller 14 to notify playbook and parent recommendation system 10 of incidents created, updated, or closed, customizations of source incidents, use of generated playbooks, and additions or removals of actions from playbooks; and, API controller 14 makes REST calls to cybersecurity incident response system 12 to notify it of proposed playbook actions. The playbook and parent recommendation system 10 is able to autonomously construct and update the model independently of the cybersecurity incident response system platform.

The playbook and parent recommendation system 10 accesses the data in databases 16 and 18 through its connectors 20 and 22 and gets all relevant data for building the model from the databases (both MongoDB database 16 and PostgreSQL database 18—the two databases utilized by the cybersecurity incident response system 12). Mongo connector 20 defines how data is either read from or stored to MongoDB database 16. Incident connector 22 defines how data is either read from or stored to PostgreSQL database 18. An incident is represented as a row in an incidents table in the PostgreSQL database. To be able to convert the columns of the table to features in feature transformer 24 we first need to know the types of the columns. These types are fetched from a fields definition table. Also, some of the columns of the table are encrypted. This information is obtained from an information_schema table. Information from all these three tables combined allows us to load the stored data to playbook and parent recommendation system 10 and further parse the data.

Feature transformer 24 encapsulates all of a set of feature generators, details of which are described below. Feature transformer 24 provides an application program interface that, given the parsed data from the incidents table described above, produces a Boolean matrix of extracted features.

Features correspond to incident fields. Each field can be configured with a weight. In this manner, the user can customize each field and the importance the fields have for the machine learning technique. Each feature generator is a transformation that for a given value from an incident and its type produces one or more features. The following feature generators are implemented: Boolean feature generator, present feature generator, enum feature generator, and enum set feature generator. The operation of these feature generators is described below in connection with FIG. 2.

The playbook and parent recommendation system 10 saves its model and performance measurements, as well as the playbooks played for each incident, into several MongoDB Collections. The playbook generation and parent recommendation system itself is exposed through a web server providing REST implementation of the API.

Algorithm Architecture:

Playbook and parent recommendation system 10 performs playbook generation and customization by following the standard machine learning approach: model construction, model query and model update. In the first stage a model is constructed based on the historical data. In a query stage the model is queried for an output (i.e., a recommended playbook). In the update stage, the model is updated with new information.

The machine learning technique is based on the concept of fuzzy nearest neighbor search and subsequent data fusion. An example of fuzzy nearest neighbor search is described in Keller, James M., Michael R. Gray, and James A. Givens, "A fuzzy k-nearest neighbor algorithm," IEEE transactions on systems, man, and cybernetics 4 (1985): 580-585 (ieeexplore.ieee.org/document/6313426), which is hereby incorporated herein by reference.

Model Construction: The main steps of the model construction stage are as follows:

1) Extraction of relevant attributes and translation into features; and
2) Transformation of historical (closed) incidents into the feature space; and
3) Storage of the populated feature space; and
4) Storage of custom actions played for each incident.

The transformation of features of an incident into a feature space (by feature transformer 24 in FIG. 1) involves creation of a feature vector, which is an n-dimensional vector of numerical features that represent the incident. The feature space is the vector space associated with the feature vectors.

Model Query: The model is queried by requesting playbook for a new incident. The main steps are the following:

1) Transformation of the new incident into the features;
2) Localization of K nearest neighbors (special cases for highly irregular feature spaces are described below);
3) Fusion of: frequencies of action played, distance of neighbors from the incident, age of closed incidents, and user feedback; and
4) Thresholding of the action set to get the playbook.

Model Update: The model is updated once a particular new incident is closed. This means that the following steps (similar to the model construction stage) are performed:

1) Transformation of the closed incident into the feature space;
2) Update of the stored feature space; and
3) Update of the custom action storage.

Feature Space Representation and Incident Similarity:

In the playbook generation system of U.S. Pat. No. 10,439,884, the features for an incident were generated from fields, each of which had a certain type. All different types are separated into four groups: 1) untranslatable into the feature space (Feature=None) (for example, the "text" type is too rich to translate); 2 Boolean encoding—(i.e., types that are either Boolean by nature or have information that is tested for presence—i.e., present or missing); 3) one-hot encoding (a special type of encoding for types that contain a finite set of possible values); 4) many-hot encoding—a generalization of one-hot encoding that allows multiple positions of a vector to be true.

According to the present invention, however, incident similarity is defined using the distance between two incidents and is computed as a sum of distances of the individual fields. The definition of the distance functions of the individual types of fields is illustrated in the table of FIG. 2, which illustrates the transformation of different types of fields into features with corresponding metrics. In FIG. 2, field type "enum" is the programming language keyword to express one (and only one) value chosen from a list of finite values (for example, incident status can be chosen from the following list: open, closed, frozen, false positive (and eventually other user-defined values). It can be only one value at a time. Field type "Multi_select_list," similar to the "Enum" type, allows one or more values to be chosen from a list of finite values (for example, the incident type or types can be chosen form a finite list: fraud, threat intel, phishing, and eventually other user-defined values). Each incident can have multiple values at a time.

Field type "checkbox" allows an incident value to be represented as an on/off checkbox in an input form. Field type "tags" allows words or small phrases to be specified to characterize an item, in order quickly to define searching/indexing keywords for an incident. Other field types are self-explanatory.

Fields metrics: The types of fields can be divided into three categories:

1) Primitive values—The feature can be represented as one single value. For this type of feature the PresentOrEqual metric is used. The value is computed as follows: 0 . . . if both values are missing or both values are present and equal; 1 . . . if only one value is missing, but the other is present; 2 . . . if both values are present, but not equal.
2) Enumerations—The feature cannot be represented by one value, but rather by a set of values. For these features symmetric difference is used as a metric. The value is computed as a number of items in the first set that are not present in the second set plus the number of items in the second set that are not present in the first set.
3) Fields that are too specific or uninformed—Values of these fields cannot be used in the similarity computation. For example: DATE has a special place in the similarity computation, and DYNAMIC values and COLORs might be different for a very similar pair of incidents.

Incident description metric: There is one exception to the mapping described above. The Description field which is of type TEXT. It is expected that users will fill in rich descriptions that allow complex features to be derived from it. The TF-IDF algorithm is used. It produces an array of several features for each description. The similarity of two descriptions is then computed using cosine similarity between their TF-IDF representations. This algorithm takes into account the frequency with which individual words occur.

Nearest Neighbor Search

Figure 3:
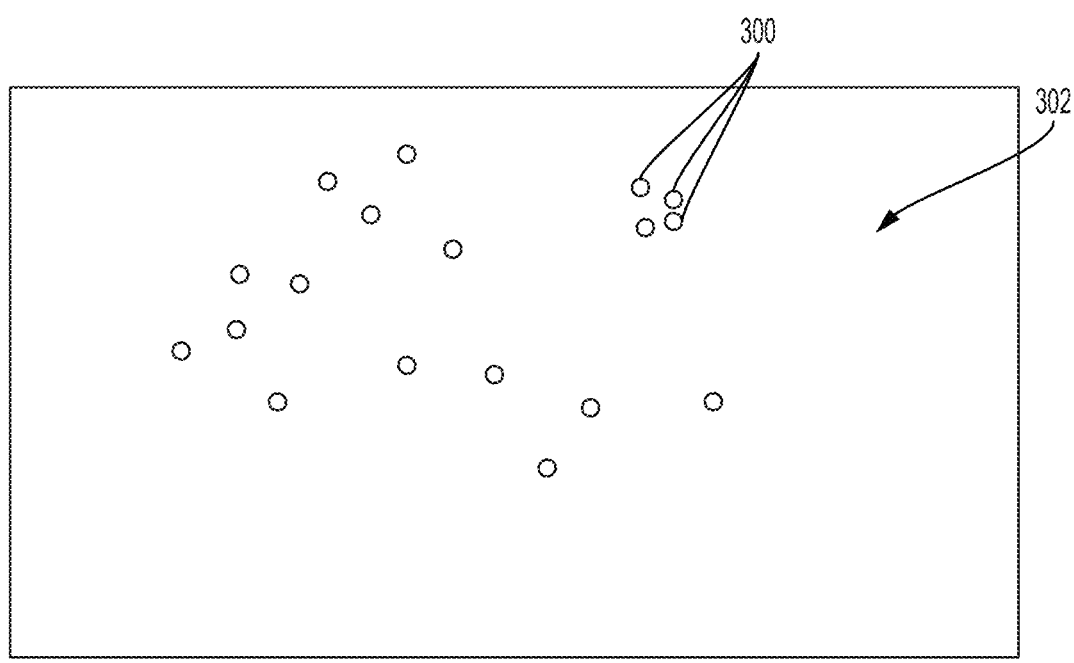
FIG. 3 is a two-dimensional representation of a set of incidents in a many-dimensional feature space.

With reference to FIG. 3, there is shown a representation of incidents 300 in a two-dimensional representation of what is actually a many-dimensioned feature space 302. A two-dimensional projection of a multi-dimensional space is chosen only for ease of illustration. In particular, a number of historical incidents 300 are defined by their attributes. These incidents are represented as samples in a so-called feature space 302. The features are constructed from the attributes of the incident. The representation of FIG. 3 will evolve in the next sections to explain steps of the nearest neighbor search.

Figure 4:
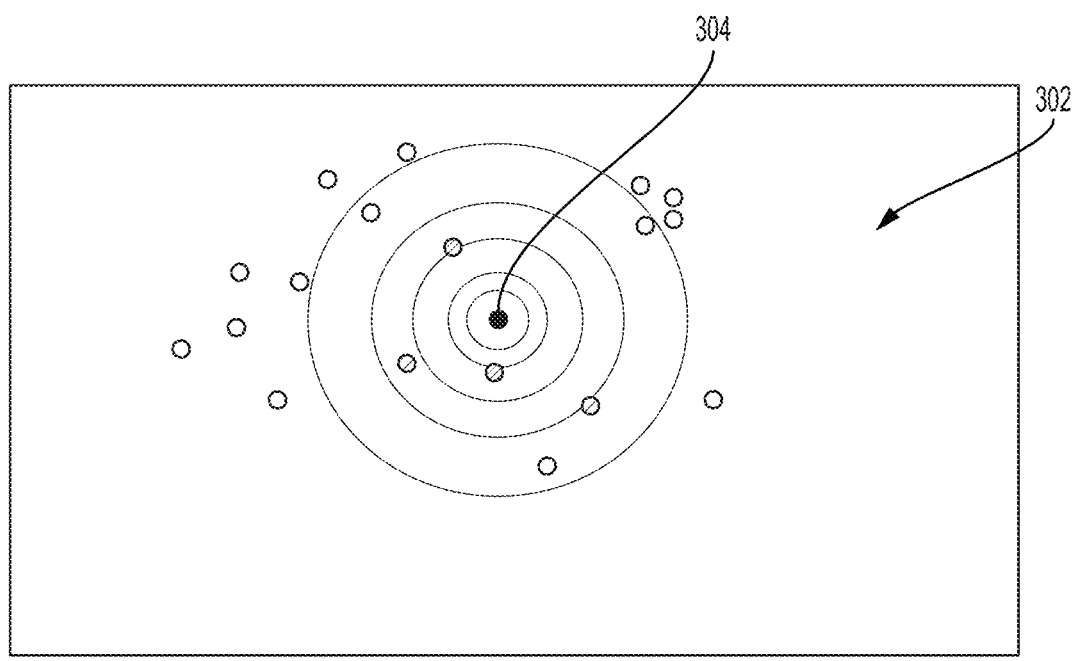
FIG. 4 is the two-dimensional representation of FIG. 3, with concentric circles, named "clusters," illustrating distances within the feature space with respect to a particular new incident.

With reference to FIG. 4, the feature space 302 is a space over which a distance metric can be defined. With the metric, one can measure the distance between any two points on the feature space. Given two incidents with different attributes, they can be transformed into the feature space (through the encoding explained above) and subsequently, a metric can be called. This metric measures the distance in the feature space, and thus we can compare distance between any two incidents. Using this approach, we can find K nearest neighbors (with asymptotically linear complexity). In FIG. 4, the nearest neighbors of incident 304 are those other incidents whose distance in the feature space as measured by the metric is shortest with respect to incident 304. The concentric circles in FIG. 4 represent different distances from incident 304 as measured by the metric.

Data Fusion

Figure 5:
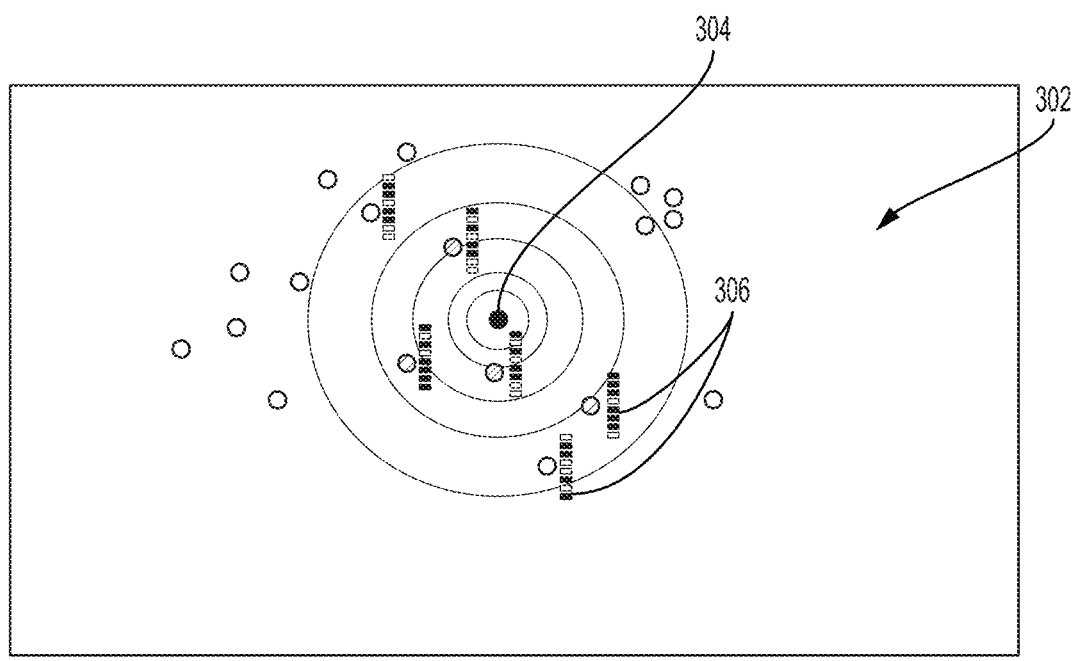
FIG. 5 is the two-dimensional representation of FIG. 4, together with representations of playbooks for K nearest neighbors of the particular new incident.

With reference to FIG. 5, given K nearest neighbors of incident 304 (the neighbors within the outermost circle in FIG. 5), it is possible to get all playbooks 306 played for each incident. The existing incidents in the feature space 302 have been resolved previously and thus have one or more playbooks 306 with actions assigned. The rectangles of playbooks 306 correspond to actions. In reality, the set of rectangles correspond to all actions every played. Those actions that were committed are colored dark. In other words, for each incident, the committed actions from the complete action set are listed. The playbooks in general differ in some actions, and some actions are identical for various playbooks. In FIG. 5, playbooks are represented by rectangles correspond to Boolean representations of eight different actions that may or may not have been called for in different playbooks. As the incidents are closed, we expect that the committed and completed actions are those that should be recommended. For each incident, we collect all committed actions. These committed actions are considered to be ideal playbooks for each incident.

The formulas set forth below, which culminate in a score calculation for a particular action, are iterated over all actions in the action set, and for each action, there is a Boolean value of 0 or 1 depending on whether the action was committed composed with a floating point number to describe how much it is in connection with a particular incident. The actions themselves are not Boolean, however, because they are prescriptions for the operator of what to do.

Having the set of actions to be recommended for each past incident, we consider each action separately. For each action, we compute a score from the interval [0,1] that translates into the certainty of recommending this action. The following partial computations are used for the computation of the score:

relevance $\alpha(i_{new}, i_{ref}) = 1/(\alpha \cdot dist(i_{new}, i_{ref}) + (1-\alpha) \cdot age(i_{ref}) + 1)$ I.e., first, the relevance of an incident with respect to another one is defined by the equations above. The relevance is given by the distance between the incidents in the feature space and by the age of the reference incident (given that the new incident has age 0). To find K neighbors, the relevance of each incident is measured as defined by the above equation.

Using the relevance equation, it is possible to find K nearest incidents according to a weighted metric, which is influenced by the user's setting of the parameter α, discussed below.

The distance between two incidents is computed as the average of weighted feature values:

$$dist_w(i_1, i_2) = \frac{1}{\sum_{f \in features} w_f} \sum_{f \in features} w_f \cdot \|i_1[f] - i_2[f]\|_1$$

The weights are set by the users in the user interface and are set to ignore, low, medium, and high, corresponding to values 0, 2, 4, 8 respectively (the float weight values described in the above-referenced U.S. Pat. No. 10,439,884 have been changed to integers to make it easier to handle calculations algorithmically; this change has no effect on the output). Ignored fields are not considered, low-weight fields are half as important as the default medium fields, and high-weight fields are twice as important as default medium fields and four times as important as low-weight fields.

The age($i_{ref}$) function is defined as:

age($i_{ref}$)=min(1;days($i_{ref}$)/τ)

Figure 6:
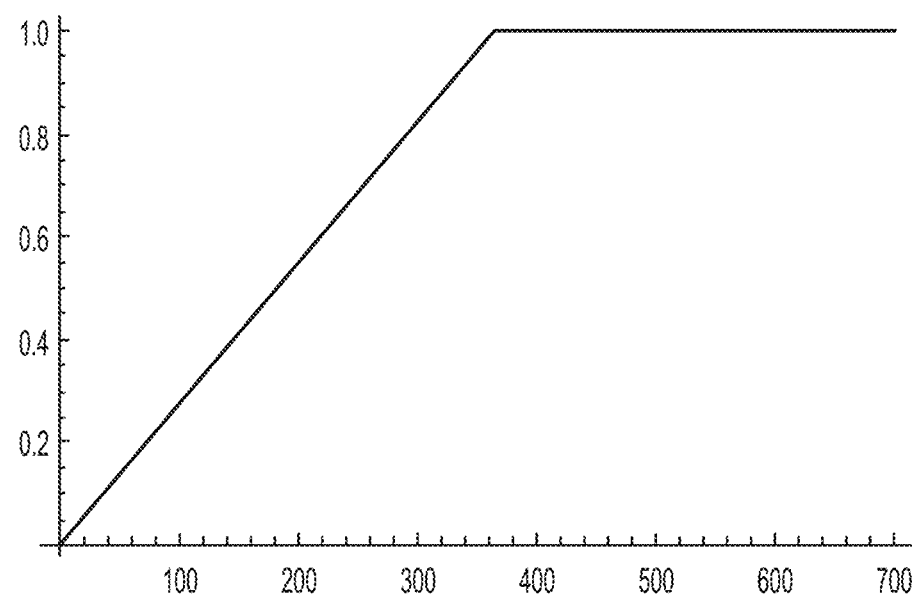
FIG. 6 is a plot of an age function used in accordance with the invention as part of the process of determining relevance of a prior incident with respect to a new incident.

I.e., it is a normalized thresholded age, where days($i_{ref}$) is the incident age in days and τ is a threshold with a default value set to 365. The plot of FIG. 6 shows the behavior of the age($i_{ref}$) function for the default values.

The α parameter is from the range [0,1] and it specifies the weight that is given to similarity and weight that is given to age (either the similarity of incidents is more important and the age is less important or vice versa). By default, the recommended value is 0.5.

Finally, the score of an action is computed as an average relevance weighted by the commitment frequency of the action:

$$score(a_j, i_{new}) = \frac{1}{|n|} \sum_{i_{ref} \in relevant} committed(i_{ref}, a_j) \cdot relevance_\alpha(i_{new}, i_{ref}) \forall a_j \in A$$

The score is computed over all relevant incidents (denoted as "relevant" in the sum subscript) by the multiplication of action presence (denoted by function "committed($i_{ref}$, a)" which returns 1 if the action $a_j$ was committed in the incident $i_{ref}$, 0 otherwise) with incident relevance. There are K nearest incidents (determined according to the relevance distance discussed above) that are members of the "relevant" set. The action set "A" is the complete set of actions in the security incident response platform. The set "A" can be optimized (its size minimized) by defining A as a union of committed actions over all relevant incidents. Computationally, however, the mathematical operations over the action set are very fast, and the asymptotical complexity is linear, and so the size of the action set should not matter.

The fuzziness of the approach described above lies in the computation of an action score; i.e., the relevance is used to weigh the score of the action. In other words, the fuzzy set membership is defined by the relevance and it is used to "merge" information from the K nearest neighbors together. In contrast, a classical non-fuzzy K nearest neighbor technique might omit the relevance in a score computation and the score would be given only as the number of times the action was committed divided by K.

Playbook Generation Process

Once all actions have a score assigned, we can choose a threshold. All actions with a score above the threshold will be recommended to be played. For multiple thresholds, multiple playbooks can be generated automatically as well.

Handling Special Cases

The spatial distribution of incidents within the feature space can vary widely from client to client. The following sections describe special cases and describes, how the system handles these cases.

Few Data Available/Sparse Data

If only a minimal amount of data is available (i.e., the platform is installed freshly at the customer's premises), it is possible that the technique described above cannot find K nearest incidents, as they are simply not yet present in the system. In such cases, a fallback mechanism kicks in: for cases where an incident identical in the feature space is found, its playbook is used for the recommendation of actions. If multiple identical incidents are found, their playbooks are fused by the mechanism described above.

Large Clusters of Identical Incidents

In cases in which a tool is generating incidents automatically, it is possible that hundreds or thousands of identical incidents (identical in the position in the feature space, not necessarily in all data) are generated in the lifetime of the platform. In such cases, these identical incidents form a cluster in the space that overweighs all other incidents in the vicinity. If we pick K nearest incidents for a new incident that is near this cluster, all K incidents fall into the cluster, and thus there is no required variety of playbooks. In such cases, we take from the cluster only a subset, which have unique playbooks (i.e., playbooks with different sets of actions). The remaining incidents from the cluster (with playbooks also identical to the others in the cluster) are ignored and other, more distant neighbors are searched for. In other words, if there are more than (or equal to) K incidents in the cluster, no additional incidents are searched for. If there are fewer than K incidents in the cluster, additional incidents are searched for.

Figure 7:
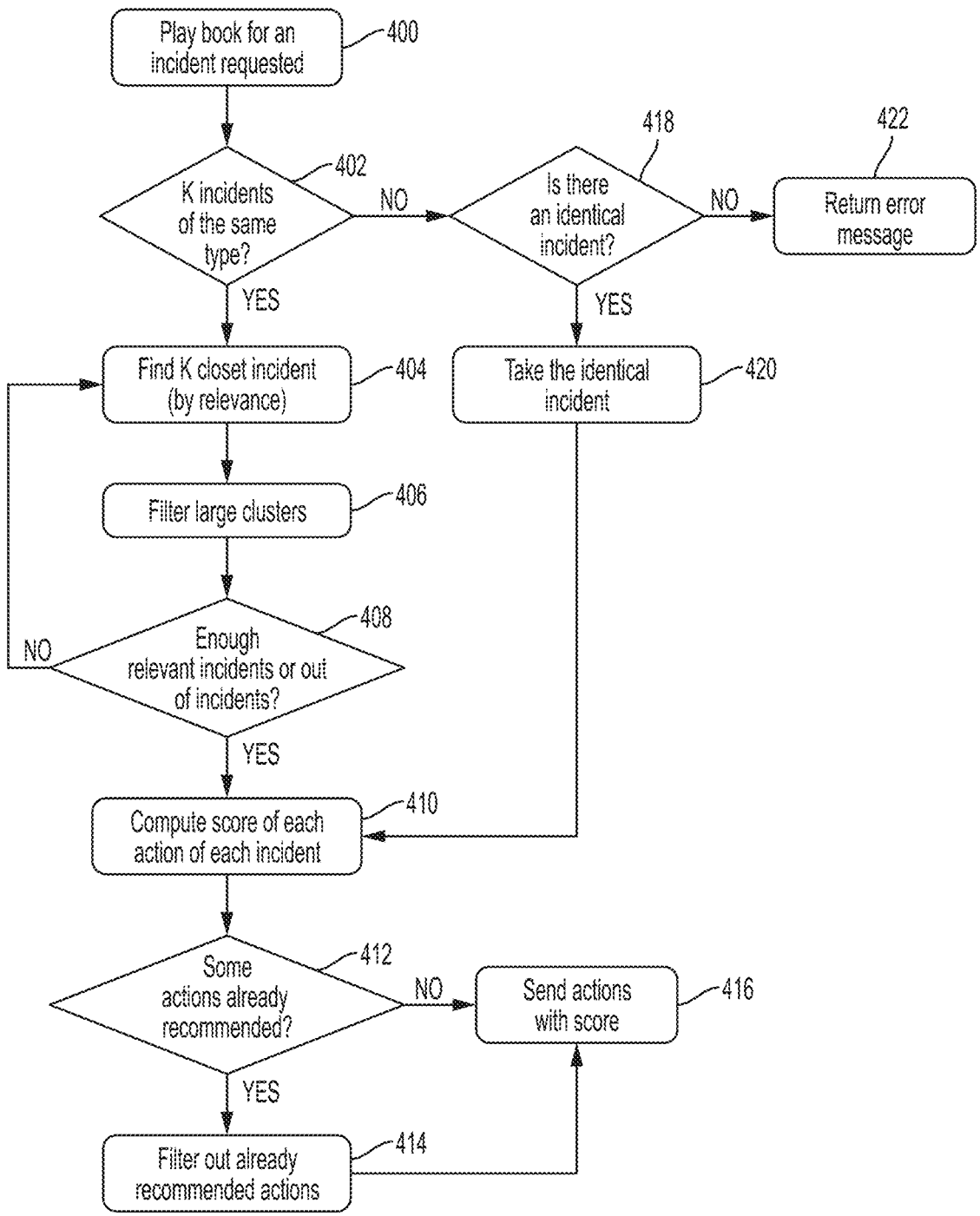
FIG. 7 is a flowchart detailing the steps corresponding to identifying K nearest neighbors and then applying the different machine learning steps to the K nearest neighbors.

FIG. 7 is a flowchart detailing the steps corresponding to identifying K nearest neighbors and then applying the different steps described above to the K nearest neighbors. In step 400, a playbook for an incident is requested. If there are K incidents of the same type (step 402), the K closest incidents are found, by relevance (step 404), and any large clusters are filtered (step 406) according to the technique described above, until enough relevant incidents are found or there are no more incidents (step 408). The score of each action of each incident is calculated using the techniques described above (step 410). If some actions have already been recommended (step 412) the already-recommended actions are filtered out (step 414); otherwise the actions with their scores are sent for comparison with a threshold (step 416).

If there were not K incidents of the same type (step 402), but there is an identical incident (step 418), the identical incident is used (step 420) for computation of the score of each action in the incident (step 410); otherwise an error message is returned (step 422).

Parent Suggesting Process

The motivation behind parent suggestion is that incidents form natural relationships. For example, a newly created incident might be directly caused by the same factors as some existing historical incidents.

The parent suggesting process reuses the feature extraction and k-nearest neighbors search implemented for the playbook generation procedure. The difference is that the search includes both the closed and open incidents. Moreover, only one parent incident is suggested, unless the parent suggesting process is configured with a maximum number of parents to be suggested that is greater than one.

The process of finding a parent incident reuses some of the steps from playbook generation. Similar to playbook generation as described in FIG. 7, features are extracted from the given incident and the nearest neighbors of the incident are found. However, only one incident needs to be suggested to be a parent. The same problem with too few or too sparse data applies here as well. To overcome this problem, at least M incidents of the same type are required to be present in order to be able to find a parent (similar to steps 402, 418, 420, and 422 of FIG. 7). The constant M can be set in the config.

The confidence of recommendation: The confidence consists of three parts: the maximum confidence, confidence from the parent distance, and confidence from the ratio of neighboring incidents with the parent.

The maximum confidence scales the confidence computed by other means from range [0, 1] to [0, max_confidence]. It is computed as a complement to relative count of incidents in the significant neighborhood. The purpose of the maximum confidence is to scale down the final confidence if there are other incidents close to the parent.

$$\mathrm{conf}_{max}(i_p) = 1 - \frac{|\text{significant neighborhood}(i_p)|}{|\text{incidents}| - 1}$$

$$\text{significant neighborhood}(i_p) = \{i_x; dist_w(i_{ref}, i_x) \leq dist_w(i_{ref}, i_p) + \sigma, i_x \neq i_p\}$$

The confidence from the parent distance is dependent only on the distance of the parent from the reference incident and the distribution of incident distances, specifically the standard deviation $\sigma$. This confidence is low if the distance of the parent is high.

$$\mathrm{conf}_{parent}(i_p) = e^{-dist_w(i_{ref}, i_p)/\sigma}$$

The confidence from the neighbor's distance is computed as the mean value of ratios of the parent distance and incidents in the significant neighborhood. This value represents how close to the parent are the neighbors, meaning if the neighbors in the significant neighborhood have similar distance as the parent the confidence will be low and if the distances of the neighbors are much higher than the parent distance the confidence is high.

$$\mathrm{conf}_{neighbors}(i_p) = \frac{1}{|\text{significant neighborhood}(i_p)|} \sum_{i_x \in \text{significant neighborhood}(i_p)} \max\left(0, 1 - \frac{dist_w(i_{ref}, i_p)}{dist_w(i_{ref}, i_x)}\right)$$

The final confidence is then computed as follows:

$$\mathrm{conf}(i_p) = (\alpha * \mathrm{conf}_{parent}(i_p) + (1-\alpha) * \mathrm{conf}_{neighbors}(i_p)) * \mathrm{conf}_{max}(i_p)$$

Performance overview: To ensure the algorithm runs sufficiently fast, the number of incidents can be limited to only the latest ones (the maximum number can be set in configuration). This way it is possible to speed up the algorithm, but the results can be less accurate, since the oldest incidents are ignored. The observed speeds of searching five nearest neighbors for different data sizes are as follows:

10 k incidents in the model: 0.774 seconds;
10 k incidents in the model limited to 1 k latest ones: 0.226 seconds;
1 k incidents in the model: 0.142 seconds.

These observed speeds of searching relate to the incident clustering feature that is shared between both processes: playbook and parent suggestions.

User Feedback Integration

The user feedback to playbook recommendation is integrated in the following way:

1) If the user does not pick the recommended playbook at all and picks a different playbook, the feature space with the incidents is enriched by this selection. In other words, the selected playbook will be tied to the incident and the recommended playbook will not be used. In subsequent cases in which the technique is employed, the selection of the different playbook will be seen in the database and the actions of the different playbook will be considered according to the technique described above in connection with similar incidents, thus adapting to the selection of the different playbook.

2) If the user picks a recommended playbook and removes some actions, the playbook is tied to the incident, which is, once closed, recorded in the feature space. In subsequent recommendations, the removed actions have a lower probability of being recommended. In other words, the feedback concerning a user removing an action is inherently reflected in playbooks generated in the future. In the technique described above, it can be seen that the relevance of an action depends on the relative number of incidents in which the action was assigned to someone. Thus, since the action was removed from an incident's playbook, when in the future actions of this particular incident are used to synthesize a new playbook the score of the action is affected by the fact that it was removed in the first place.

3) If the user picks a recommended playbook and adds some actions, these actions are custom: They are thus treated with a special flag and for the subsequent recommendations, these actions are shown irrespectively of their score (and by default selected to be played). The user will have all manually added actions present in the recommended playbook. More precisely: When a custom action is manually added by a user, the security incident response platform notifies the playbook generation and parent recommendation system. Because custom actions are uniquely identified, they have one undesired property: they can never occur in more than one playbook, and thus even though they are included in the final list of recommended actions for an incident they could seem almost irrelevant because they always occur only once. To solve this problem, a list of manually added actions are tracked and labelled as custom (treated with the above-described special flag), thereby making it possible as a practical matter to present the custom actions in the final recommendation in the user interface in a special fashion. However, the user can also remove the recommended actions from the playbook if the user wishes so, and the deleted custom actions do not need to be addressed in a special way because ordinary usage of the above-described machine learning technique augments the data such that the removed or unused actions tend to stop appearing.

4) If the user picks a recommended incident parent, the weights of features whose value of metric were the largest decrease. In other words, when a suggested parent is selected, the feature weights used to calculate such suggestion are updated. The feedback is applied on the suggested parent alone. This process can also be run automatically, without user interaction.

5) If the user picks an incident parent other than the recommended one the weights of features of the chosen incident update in the same way as in the previous point. The weights of features of the recommended incident increase based on the distance. In other words, feedback is applied both on the selected non-suggested parent (to make the user-preferred incident features nearer to the input values) and on the non-selected suggested parent (to make the calculated incident features farther from the input values). This process can also be run automatically, without user interaction.

Performance

The performance of the technique described above must be high enough to allow real-time playbook assembly. The complexity of the technique is quasilinear in the number of incidents and linear in the number of actions. To provide the above-described parent matching algorithm, some processes have been re-engineered to improve feature matching and the providing of metrics useful for choosing the parents. Such activities caused a change in the algorithm complexity as described herein relative to the above-referenced U.S. Pat. No. 10,439,884.

The transformation of the incident into the feature space is straightforward since most of the features are kept in the original format. The only feature that needs some computation is the description, where it is necessary to transform the text of the description to an array of features.

The custom machine learning technique is computationally fast (i.e., quasilinear in the number of incidents and linear in the number of actions), and thus there should be no need to increase the performance. If needed, however, performance can be increased by reducing the number of potentially relevant incidents and the number of relevant actions. If, for some reason, it becomes desirable to reduce the size of the sets, the solution would be simple: 1) to optimize (minimize the size of) action set A, it can be defined as a union of committed actions over all relevant incidents; and 2) to optimize (minimize the size of) the set of potentially relevant incidents (not to iterate over all of them, however, only over a subset), the incidents can be arranged in a quadtree to have a spatial sorting mechanism in place and iterate by distance.

Playbook API

Figure 8:
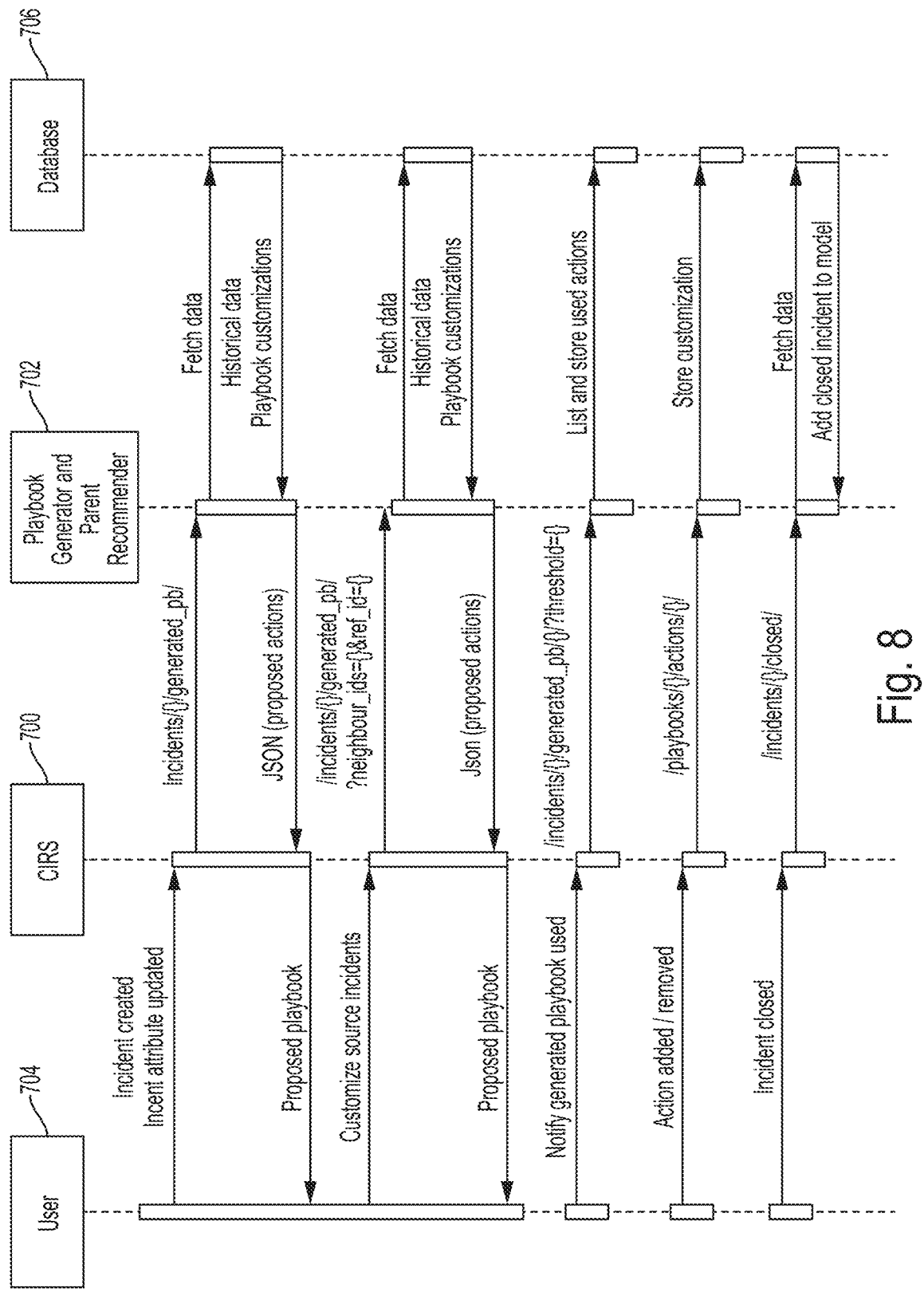
FIG. 8 is a diagram illustrating the exchange of information between a user, a cybersecurity incident response platform, a playbook generation and parent recommendation system according to the invention, and a database.

With reference to FIG. 8, the playbook API allows the cybersecurity incident response system 700 to communicate with the playbook generation and parent recommendation system 702 in a straightforward way. The user 704 has no means to communicate directly with playbook generation and parent recommendation system 702. Rather, the user interacts with the system through a web interface, which is connected to the cybersecurity incident response platform. The platform subsequently calls the playbook generation and parent recommendation system, which runs as an independent microservice on the very same virtual machine, thereby allowing handling of data models and data queries for single-tenant and multi-tenant environments, providing independent and consistent information for each isolated instance (or tenant) present on the same appliance. The playbook generation and parent recommendation system returns results to the cybersecurity incident response platform, which returns results to the user.

Some commands from user 704 trigger actions in cybersecurity incident response system 700 that call playbook generation and parent recommendation system 702, which in turn fetches data from database 706 and stores used playbook actions and playbook customizations in database 706. The diagram of FIG. 8 captures all relevant exchange of information. Playbook generation and parent recommendation system 702 is a daemon that exposes a webservice that cybersecurity incident response system 700 uses, in order to propose actions compatible with a newly created incident. The webservice exposes some REST methods to cybersecurity incident response system 700 but does not expose anything to user 704.

There are two distinct activities by which the user can modify the attributes of an incident (thus the features of the incident): (1) by creating a new incident, or (2) by updating one or more of the attributes (for example, some attributes might be missing at the beginning and during the incident response, new facts are discovered and added as attributes to the incident). The second activity arises in situations in which the user learns a new fact about the incident and updates the incident. For example, imagine that the user finds out from which IP the incident arose, and adds the IP into one of the CEF fields, which are transformed by the playbook generation and parent recommendation system into features. In this case, the playbook generation and parent recommendation system has to update feature values of the incident, after which the playbook generation and parent recommendation system can potentially present a new set of actions to be played.

The playbook generation and parent recommendation system communicates proposed playbook actions to the cybersecurity incident response platform using JSON (JavaScript Object Notation), which is de facto a standard data format for information exchange via the REST application program interface.

During the playbook recommendation phase, the user is presented with a list of recommended actions together with the relevant incidents (determined using the K nearest neighbor technique describe above) from which the actions were taken. The user can then remove or add some of the incidents (if, for example, the user does not consider them relevant or knows about an incident that might be important). The playbook generation and parent recommendation system reflects the user's actions by recomputing the proposed playbook based on the updated set of incidents, according to a process described above.

The communication framework described above is similarly used in connection with the recommendation of a parent for an incident, except that the cybersecurity incident response system returns to the user a recommended parent, instead of a proposed playbook.

REST API Definition

The REST application program interface is defined as follows:

Info
  GET /
  Return hello message from server. It is available regardless of server initialization state. It is possible to make sure that the server is running via calling this method.
Init
  POST /tenant/{tenant}/init/
  Initialize the server by providing database credentials. Calls to many other endpoints will not work without initialization, and will result in uninitilized error—503 service_unavailable.
Availability
  GET /tenant/{tenant}/types/
  Returns number of incidents per incident type.
  GET /tenant/{tenant}/types/{incident_type}/available/
  Returns if there are enough samples of a given type for the playbook and parent recommendation system to generate playbooks from it, false otherwise.
Settings
  GET /tenant/{tenant}/settings/weights/
  Get the distance weights of all features.
  POST /tenant/{tenant}/settings/weights/
  Set the weights of given features. Weights of features not provided in the payload are kept intact.
  GET /tenant/{tenant}/settings/relevant_incident_age/
  Get the age of incidents to be considered less relevant.
  POST /tenant/{tenant}/settings/relevant_incident_age/
  Set the age of incidents to be considered less relevant.
  GET /tenant/{tenant}/settings/nearest_neighbour_count/
  Get the default number of neighbours used for playbook generation.
  POST /tenant/{tenant}/settings/nearest_neighbour_count/
  Set the default number of neighbours used for playbook generation.
Projected Data
  GET /tenant/{tenant}/incidents/{incident_id}/actions/
  Debug! For a given incident id get its actions which were committed and thus are considered in the algorithm.
Playbook
  POST /tenant/{tenant}/generated_pb/
  Given an incident in a form of a map of features generate a playbook. This is done by searching for the most similar incidents and using their playbooks to synthesize a unique custom-tailored playbook. It is possible to bypass this search by specifying one or more neighbour_ids parameters.
  GET /tenant/{tenant}/incidents/{incident_id}/generated_pb/
  Given an incident in a form of a reference to a database incidents table generate a playbook. This is done by searching for the most similar incidents and using their playbooks to synthesize a unique custom-tailored playbook. It is possible to bypass this search by specifying one or more neighbour_ids parameters.
  POST /tenant/{tenant}/incidents/{incident_id}/generated_pb/
  Given an incident in a form of a reference to a database incidents table generate a playbook. The body is expected to be a JSON with values that will be used to overwrite the values obtained from the database for the particular incident. This is done by searching for the most similar incidents and using their playbooks to synthesize a unique custom-tailored playbook. It is possible to bypass this search by specifying one or more neighbour_ids parameters.
  POST /tenant/{tenant}/incidents/{incident_id}/generated_pb/{generated_playbook_id}/
  Playbook assignment notification. The referenced playbook must contain the field generated_playbook_id.
Merging
  POST /tenant/{tenant}/parents/
  Returns a list of the possible parent incidents. The features are extracted from the provided json payload.

GET /tenant/{tenant}/incidents/{incident_id}/parents/
Returns a list of the possible parent incidents. The features are extracted from the existing incident in the database.
PATCH/tenant/{tenant}/incidents/{incident_id}/parents/feedback/
This endpoint is used to notify the playbook and parent recommendation system whenever an automatically assigned parent incident gets changed. Internally, it is used to update weights of the incident metric. If the user chooses manually from multiple parent candidates, the best matching parent candidate is provided as the recommended incident.
Blacklist
GET /tenant/{tenant}/blacklist/
Get all blacklisted actions.
POST /tenant/{tenant}/blacklist/{action_id}/
Add action to blacklist.
DELETE /tenant/{tenant}/blacklist/{action_id}/
Remove action from blacklist.
Actions
POST /tenant/{tenant}/playbooks/{playbooks_incidents_id}/actions/{action_id}/
Notification about action being added to an assigned playbook.
DELETE/tenant/{tenant}/playbooks/{playbooks_incidents_id}/actions/{action_id}/
Notification about action being removed to an assigned playbook.
Incidents
GET /tenant/{tenant}/incidents/{incident_id}/parent/
Check if the given incident has a parent.
DELETE /tenant/{tenant}/incidents/{incident_id}/parent/
Unsets the has-parent flag from an incident.
PUT /tenant/{tenant}/incidents/{incident_id}/parent/{parent_id}/
Sets the has-parent flag of an incident.
GET /tenant/{tenant}/incidents/{incident_id}/closed/
Check if the given incident is closed. Only closed incidents are used in the playbook generation.
DELETE /tenant/{tenant}/incidents/{incident_id}/closed/
Removes the deleted incident from the internal model maintained by the playbook and parent recommendation system.
PUT /tenant/{tenant}/incidents/{incident_id}/closed/
Notification about incident being closed. This fact can be used to recompute the model of the playbook and parent recommendation system.
Stats
GET /tenant/{tenant}/stats/
Performance statistics endpoint of the playbook and parent recommendation system.

Figure 10:
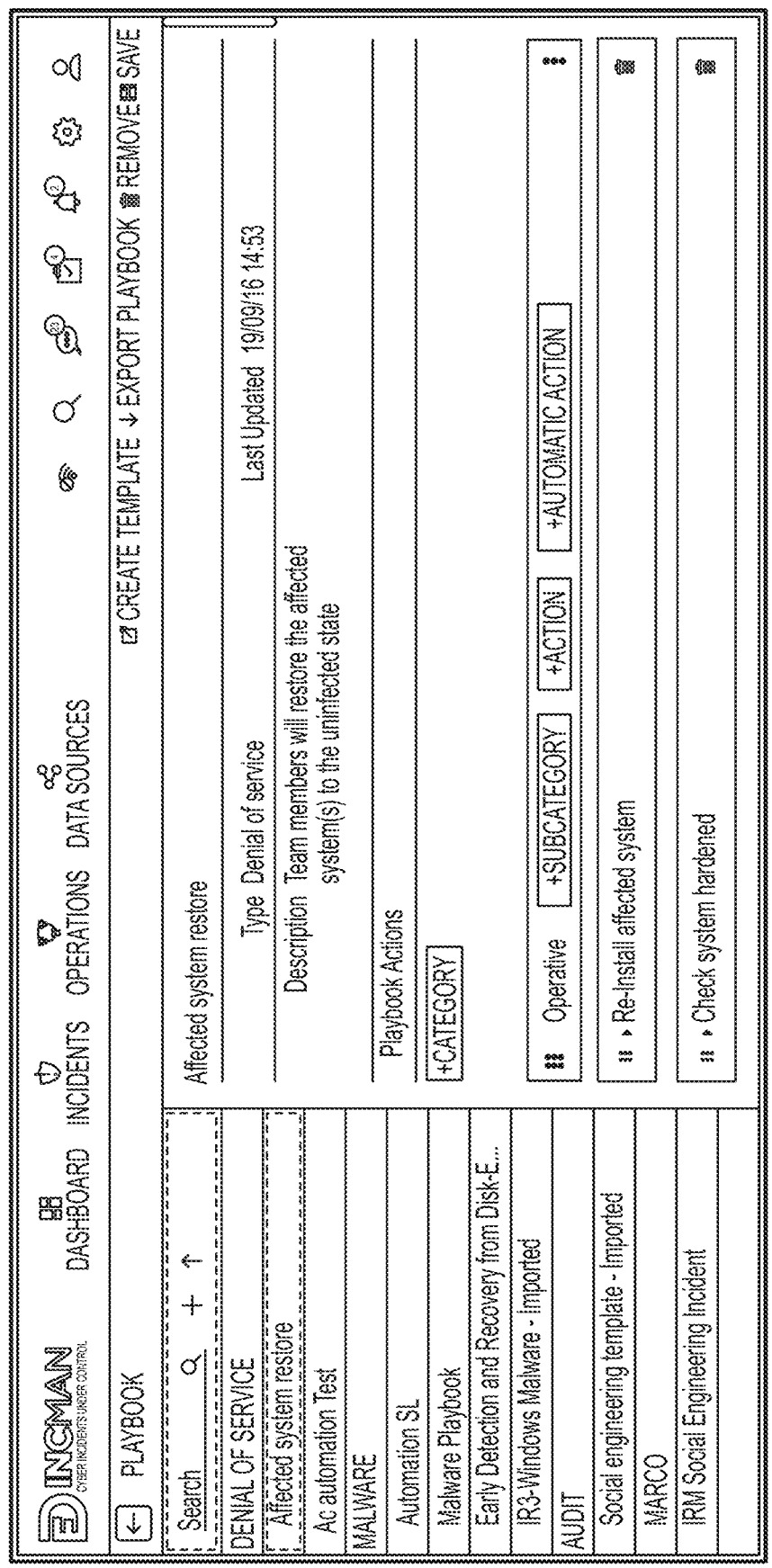
FIG. 10 is a screen display through which a custom playbook is presented to a user.
Figure 11:
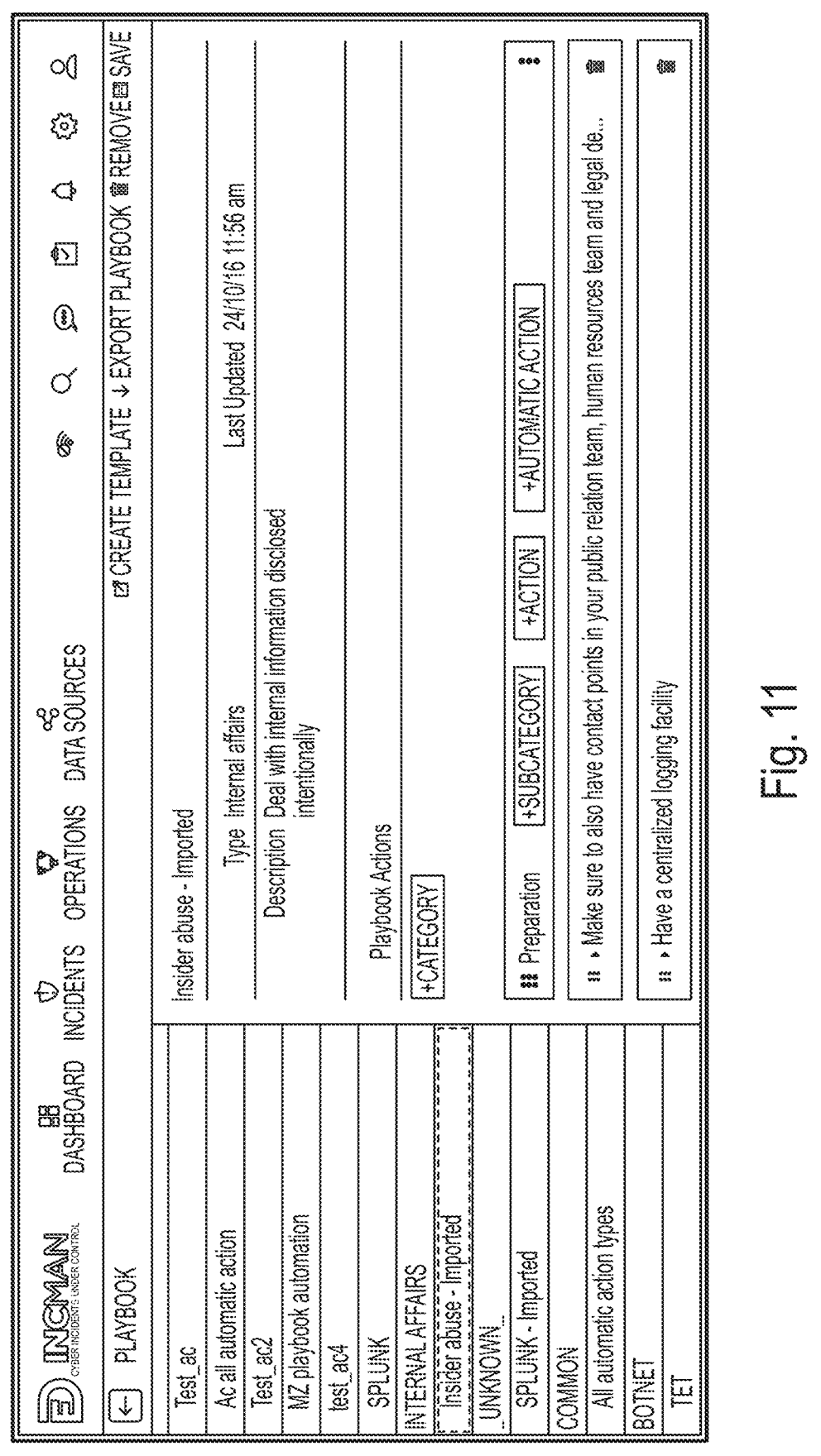

With reference to FIGS. 9-11, there are shown examples of displays through which the user interfaces with the playbook generation and parent recommendation system through the cybersecurity incident response system. FIG. 9 shows a screen display through which the user can notify the cybersecurity incident response system of the creation of an incident. FIGS. 10 and 11 show screen displays through which details of a proposed playbook are displayed to a user. In the specific example of FIG. 10, the playbook generation and parent recommendation system according to the invention has recommended a custom playbook for a denial of service incident that includes prescriptive procedures for restoring the affected system to its uninfected state. In the specific example of FIG. 11, the playbook generation and parent recommendation system according to the invention has recommended a custom playbook for an insider abuse incident that includes prescriptive procedures for dealing with internal information disclosed intentionally. In each instance, the custom playbook is produced by the playbook generation and parent recommendation system according to the techniques described herein, and the user may choose to use the custom playbook, or use a different playbook, or remove an action to the custom playbook, or add an action to the custom playbook, and the playbook generation and parent recommendation system records the user actions according to the techniques described herein, so to affect future custom playbook recommendations.

With reference to FIGS. 12-17, there are shown examples of displays through which a user can interface with the playbook generation and parent recommendation system through a cybersecurity incident response system in order to view details of, and configure, a runbook for recommending one or more parents of an incident. A runbook differs from a playbook as follows: A playbook is a linear-style checklist of required steps and actions required to successfully respond to specific incident types and threats, providing a simple step-by-step, top-down approach to orchestration. Playbooks help to establish formalized incident response processes and procedures within investigations and can ensure that required steps are systematically followed, which can help to meet and comply with regulatory frameworks. Although playbooks support both human tasks and automated actions, most users tend to use playbooks to document processes and procedures which rely heavily on tasks a human will carry out manually, such as breach notification or highly technical processes such as malware reverse engineering. A runbook consists of a series of conditional steps to perform actions, such as data enrichment, threat containment, and sending notifications, automatically, as part of the incident response or security operations process. Thus, a runbook is a flow of activities, which can be represented as a connected graph, that the cybersecurity incident response system executes one by one (following graph arrows), depending on the results of each action. This automation helps to accelerate the assessment, investigation, and containment of threats to speed up the overall incident response process. Runbooks can also include human decision-making elements as required, depending on the particular steps needed within the process and the amount of automation the organization is comfortable using. Like playbooks, runbooks can also be used to automatically assign tasks that will be carried out by a human analyst; however, most runbooks are primarily action-based. Runbooks are the core of the cybersecurity incident response system's automation capabilities. Runbooks permit administrators to create automated and semi-automated workflows using integrations, tasks, and a variety of flow control decisions and other actions. Runbook workflows can be configured to execute automatically without human intervention, or can be executed in an interactive mode, where user input is required to authorize predefined actions.

FIG. 12 is a screen display of a cybersecurity incident response system showing details of incident "ARK-121," which details appear when a user clicks on the "details" tab under "incidents" in the menu on the left side of the screen. By clicking on "detection," "containment," "remediation," "recovery," or "post-incident," the user can define a new phase in incident process (such phases are customizable to the user so as to reflect an organization's best practices in incident handling; it is possible to change the process phase to trigger an incident status change, to update the incident to a proper handling situation). The details displayed in the main part of the screen display remain the same regardless of the process phases, however, as per user configuration preferences. The displayed details include an identification of the recommended parent.

By clicking on "runbook" in the menu on the left side of the screen, the user can arrive at a screen display of one or more runbooks associated with the incident. FIG. 13 displays the "runbook" section of the current incident. Every incident has such a section. In this section are present all the "runbooks" items. In this screenshot, the incident has been bound to only one runbook, but it is possible to define in a general repository many runbooks, categorized by types, and to assign to an incident as many runbooks for that type as the user decides. This assignment operation can be performed manually, during user operation on the incident, or automatically, at creation time, when the incident is an external source ingested item, converted into an incident though some parsing mechanism. In the example of FIG. 13, there is one runbook, "ARK correlation," associated with the incident. This runbook recommends one or more parents for an incident. The runbook name and all the action names are customizable to the user.

Figure 14:
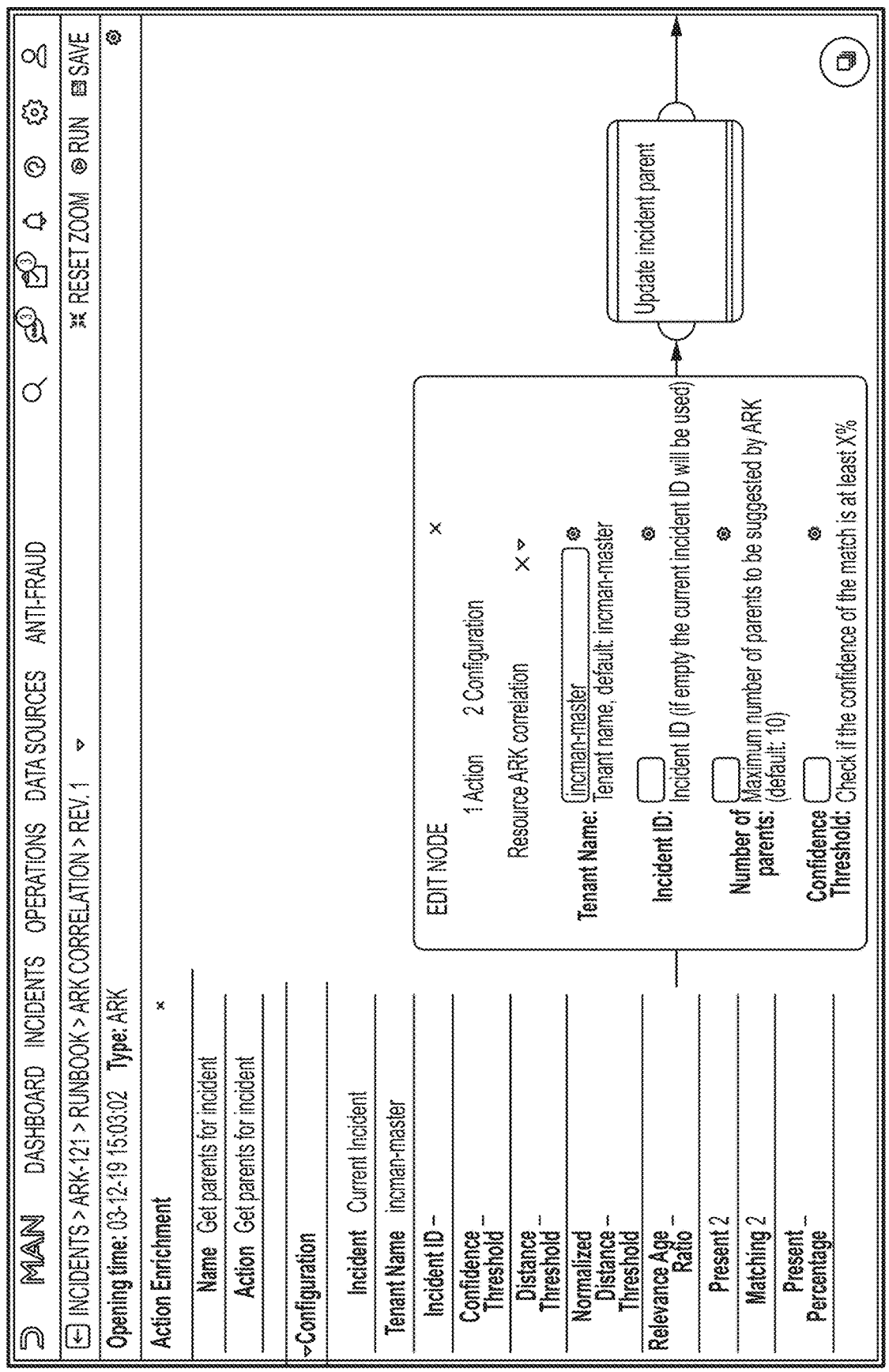
FIG. 14 is a screen display through which a user can configure "get parents for incident" action details of the workflow of the runbook for recommending one or more parents of the incident.

To open a runbook edit section, the user must click on the "pencil" icon in the right toolbar box of FIG. 13. One such runbook edit section is shown in FIG. 14. The opening of a runbook edit section allows to user to change action configurations to provide settings different from the ones from the general repository runbooks. It is not a mandatory step during incident handling. The runbook can be marked to be autorun, so the user has nothing to do to get results about parent matching, since it is executed autonomously at incident creation time. Otherwise, the user can decide to run the runbook manually, clicking on the "play" button in the right toolbar box in FIG. 13 or the "run" button on the right of the top toolbar in FIG. 14, after having clicked "save". Any action can be configured as the one in FIG. 14, but will have ad hoc settings.

In the runbook edit section of FIG. 14, a user is editing the node for a "get parents for incident" action in the workflow of the runbook "ARK correlation," in order to configure the details of this action. An action form for configuring and testing this action is illustrated in FIG. 15. The configurations for this action include: tenant name; incident ID (if empty the current incident ID will be used); number of parents (maximum number of parents to be suggested (default: 10)); confidence threshold (check if the confidence of the match is at least X %); distance threshold (check the distance of the incident to the match (0=closest, 100=farthest)); normalized distance threshold (check the normalized distance of the incident to the match (0=closest, 100=farthest)); relevance age ratio (importance of incident age in match (0=not important, 100=very important); present (check if at least X fields are involved in the match (present >=X)); matching (check if at least X fields match exactly (matching >=X)); present percentage (check if X % of the fields are involved in the match (present/total >=X)); matching percentage (check if X % of the fields match exactly (matching/total >=X)); maximum parent age; maximum parent age unit; incident field age (a datetime field based on which the comparison will be done; example (openingtime, closingtime, starttime)). Certain of the above configurations do not appear in the action form shown in FIG. 15 because scrolling is required for these configurations to be viewed.

The "get parents for incident" action can be released as a set of certified integration framework files that the user will import in the user's instance and start using without the need for programming language capability, but rather just configuring the resource and action details, in accordance with the open integration framework described in U.S. patent application Ser. No. 16/675,524, filed Nov. 5, 2019, filed by the applicant of this application. FIG. 16 is a screen display through which a user can view an overview of an integration for the "ARK correlation" runbook for recommending one or more parents of the incident. The action settings for the "get parents for incident" action are displayed under "optional fields" in FIG. 16. FIG. 17 is a screen display of a form through which a user can edit resource settings of the integration for the runbook for recommending one or more parents of the incident.

There has been described a cybersecurity incident response and security operation system and method employing playbook generation and parent matching through custom machine learning. While several particular forms of the invention have been illustrated and described, it will be apparent that various modifications and combinations of the invention detailed in the text and drawings can be made without departing form the spirit and scope of the invention. Accordingly, it is not intended that the invention be limited, except as by the appended claims.

What is claimed is:

1. A computer-readable, non-transitory, tangible medium comprising a set of instructions that, when executed by a processor, causes the processor to perform a method of responding to cybersecurity incidents, comprising:

at a security incident response platform, registering a cybersecurity incident;

at a playbook generation system:
receiving details of the cybersecurity incident from the security incident response platform, at least some of the details corresponding to a set of features of the cybersecurity incident;
localizing a set or subset of nearest neighbors of the cybersecurity incident in a feature space, the nearest neighbors of the cybersecurity incident being other cybersecurity incidents having a distance from the cybersecurity incident within the feature space that is defined by differences in features of the nearest neighbors with respect to the set of features of the cybersecurity incident; and
creating a playbook for responding to the cybersecurity incident, the playbook having one or more prescriptive procedures, for responding to the cybersecurity incident registered by the security incident response platform, that are based on occurrences of prescriptive procedures previously employed in response to the nearest neighbor cybersecurity incidents, and on distances of the nearest neighbors of the cybersecurity incident in the feature space;

at the security incident response platform, presenting the playbook containing the one or more prescriptive procedures for responding to the cybersecurity incident; and at the security incident response platform, initiating the one or more prescriptive procedures contained in the playbook to respond to the cybersecurity incident;

wherein the differences in features of the nearest neighbors with respect to the set of features of the cybersecurity incident are calculated, for at least one feature, using a present-or-equal metric having a first value if both values of the feature are missing or both values are present and equal, a second value if only one value of the feature is missing, but the other value is present, and a third value if both values of the feature are present, but not equal.

2. A computer-readable, non-transitory, tangible medium comprising a set of instructions that, when executed by a processor, causes the processor to perform a method of responding to cybersecurity incidents, comprising:
   at a security incident response platform, registering a cybersecurity incident;
   at a playbook generation system:
      receiving details of the cybersecurity incident from the security incident response platform, at least some of the details corresponding to a set of features of the cybersecurity incident;
      localizing a set or subset of nearest neighbors of the cybersecurity incident in a feature space, the nearest neighbors of the cybersecurity incident being other cybersecurity incidents having a distance from the cybersecurity incident within the feature space that is defined by differences in features of the nearest neighbors with respect to the set of features of the cybersecurity incident; and
      creating a playbook for responding to the cybersecurity incident, the playbook having one or more prescriptive procedures, for responding to the cybersecurity incident registered by the security incident response platform, that are based on occurrences of prescriptive procedures previously employed in response to the nearest neighbor cybersecurity incidents, and on distances of the nearest neighbors of the cybersecurity incident in the feature space;
   at the security incident response platform, presenting the playbook containing the one or more prescriptive procedures for responding to the cybersecurity incident; and
   at the security incident response platform, initiating the one or more prescriptive procedures contained in the playbook to respond to the cybersecurity incident;
   wherein the differences in features of the nearest neighbors with respect to the set of features of the cybersecurity incident are calculated, for at least one other feature, using a symmetric difference metric having a value computed based on a number of items in a first set that are not present in a second set and a number of items in a second set that are not present in a first set.

3. A computer-readable, non-transitory, tangible medium in accordance with claim 2, wherein the first set is a set of strings defining the at least one feature for the cybersecurity incident and the second set is a set of strings defining the at least one feature for one of the nearest neighbors.

4. A computer-readable, non-transitory, tangible medium in accordance with claim 2, wherein the first set is a set of integers defining the at least one feature for the cybersecurity incident and the second set is a set of integers defining the at least one feature for one of the nearest neighbors.

5. A computer-readable, non-transitory, tangible medium comprising a set of instructions that, when executed by a processor, causes the processor to perform a method of responding to cybersecurity incidents, comprising:
   at a security incident response platform, registering a cybersecurity incident;
   at a playbook generation and parent recommendation system:
      receiving details of the cybersecurity incident from the security incident response platform, at least some of the details corresponding to a set of features of the cybersecurity incident;
      localizing a set or subset of nearest neighbors of the cybersecurity incident in a feature space, the nearest neighbors of the cybersecurity incident being other cybersecurity incidents having a distance from the cybersecurity incident within the feature space that is defined by differences in features of the nearest neighbors with respect to the set of features of the cybersecurity incident;
      creating a playbook for responding to the cybersecurity incident, the playbook having one or more prescriptive procedures, for responding to the cybersecurity incident registered by the security incident response platform, that are based on occurrences of prescriptive procedures previously employed in response to the nearest neighbor cybersecurity incidents, and on distances of the nearest neighbors of the cybersecurity incident in the feature space; and
      identifying a parent for the cybersecurity incident, based on distances of the nearest neighbors of the cybersecurity incident in the feature space; and
   at the security incident response platform:
      presenting the playbook containing the one or more prescriptive procedures for responding to the cybersecurity incident; and
      recommending the parent for the cybersecurity incident identified by the playbook generation and parent recommendation system.

6. A computer-readable, non-transitory, tangible medium in accordance with claim 5, wherein the step of recommending the parent is performed through a playbook action.

7. A computer-readable, non-transitory, tangible medium in accordance with claim 5, wherein the step of recommending the parent is performed through a runbook action.

8. A computer-readable, non-transitory, tangible medium in accordance with claim 5, wherein the step of identifying the parent comprises finding only a nearest one of the nearest neighbors of the cybersecurity incident in the feature space.

9. A computer-readable, non-transitory, tangible medium in accordance with claim 5, wherein the step of recommending the parent comprises returning a confidence level for the recommended parent.

10. A computer-readable, non-transitory, tangible medium in accordance with claim 9, wherein the confidence level is limited by a maximum confidence, computed as a complement to relative count of incidents in a significant neighborhood, to scale down the confidence level if there are other incidents close to the parent.

11. A computer-readable, non-transitory, tangible medium in accordance with claim 9, wherein the confidence level includes a confidence from the parent distance, dependent on the distance of the parent from the cybersecurity incident and the distribution of incident distances, the confidence from the parent distance decreasing with increasing distance of the parent from the cybersecurity incident.

12. A computer-readable, non-transitory, tangible medium in accordance with claim 9, wherein the confidence level includes a confidence from a ratio of neighboring incidents with the parent, computed as a mean value of ratios of the distance from the cybersecurity incident of the parent and incidents in a significant neighborhood, the confidence from the ratio of neighboring incidents with the parent representing how close the neighboring incidents are to the parent.

13. A computer-readable, non-transitory, tangible medium in accordance with claim 12, wherein if the neighboring incidents in the significant neighborhood have a distance similar to the parent the confidence from the ratio of neighboring incidents with the parent will be relatively low and if the neighboring incidents in the significant neighborhood have a distance much higher than the parent the confidence from the ratio of neighboring incidents with the parent will be relatively high.

14. A computer-readable, non-transitory, tangible medium in accordance with claim 5, wherein the step of creating a playbook is based on the nearest neighbor cybersecurity incidents that are closed, and the step of identifying a parent is based on the nearest neighbors of the cybersecurity incident without regard to whether the nearest neighbors open or closed.

15. A computer-readable, non-transitory, tangible medium in accordance with claim 5, further comprising enabling the parent suggesting process to be configured with a maximum number of parents to be suggested that is greater than one.

16. A computer-readable, non-transitory, tangible medium comprising a set of instructions that, when executed by a processor, causes the processor to perform a method of responding to cybersecurity incidents, comprising:
   at a security incident response platform, registering a cybersecurity incident;
   at a parent recommendation system:
      receiving details of the cybersecurity incident from the security incident response platform, at least some of the details corresponding to a set of features of the cybersecurity incident;
      localizing a set or subset of nearest neighbors of the cybersecurity incident in a feature space, the nearest neighbors of the cybersecurity incident being other cybersecurity incidents having a distance from the cybersecurity incident within the feature space that is defined by differences in features of the nearest neighbors with respect to the set of features of the cybersecurity incident;
      identifying a parent for the cybersecurity incident, based on distances of the nearest neighbors of the cybersecurity incident in the feature space;
   at the security incident response platform, recommending the parent for the cybersecurity incident identified by the parent recommendation system;
   at the security incident response platform, selecting the recommended parent or selecting a parent other than the recommended parent;
   the parent recommendation system adjusting, based on the recommended parent or the parent other than the recommended parent being selected, weights of features upon which distances in the feature space are based, the parent recommendation system being programmed to decrease weights of features of the recommended parent if the recommended parent is selected, and, if the parent other than the recommended parent is selected, to decrease weights of features of the parent other than the recommended parent or to increase weights of features of the recommended parent.

17. A computer-readable, non-transitory, tangible medium in accordance with claim 16, wherein the parent recommendation system programmed to decrease weights of features of the recommended parent whose value of metric are greatest if the recommended parent is selected.

18. A computer-readable, non-transitory, tangible medium in accordance with claim 16, wherein the parent recommendation system programmed to decrease weights of features of the parent other than the recommended parent whose value of metric are greatest if the parent other than the recommended parent is selected.

19. A computer-readable, non-transitory, tangible medium in accordance with claim 16, wherein the parent recommendation system is programmed to adjust weights of features only of the recommended parent, if the recommended parent is selected.

20. A computer-readable, non-transitory, tangible medium in accordance with claim 16, wherein the parent recommendation system is programmed to adjust weights of features of the recommended parent and the parent other than the recommended parent, if the parent other than the recommended parent is selected.

* * * * *